United States Patent
Li et al.

(10) Patent No.: US 11,718,556 B2
(45) Date of Patent: Aug. 8, 2023

(54) GLASS FOR CHEMICAL STRENGTHENING, CHEMICALLY STRENGTHENED GLASS, AND ELECTRONIC DEVICE CASE

(71) Applicant: AGC Inc., Chiyoda-ku (JP)

(72) Inventors: Qing Li, Tokyo (JP); Akio Koike, Tokyo (JP); Eriko Maeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 781 days.

(21) Appl. No.: 16/747,584

(22) Filed: Jan. 21, 2020

(65) Prior Publication Data

US 2020/0156994 A1    May 21, 2020

Related U.S. Application Data

(63) Continuation of application No. PCT/JP2018/027577, filed on Jul. 23, 2018.

(30) Foreign Application Priority Data

Jul. 26, 2017 (JP) ................................. 2017-144868
Jan. 10, 2018 (JP) ................................. 2018-002200
Jan. 18, 2018 (JP) ................................. 2018-006451

(51) Int. Cl.
| | |
|---|---|
| B32B 15/04 | (2006.01) |
| B32B 17/06 | (2006.01) |
| C03C 21/00 | (2006.01) |
| C03C 3/083 | (2006.01) |
| C03C 4/00 | (2006.01) |
| C03C 10/00 | (2006.01) |

(52) U.S. Cl.
CPC ............ *C03C 21/002* (2013.01); *C03C 3/083* (2013.01); *C03C 4/0028* (2013.01); *C03C 10/0027* (2013.01)

(58) Field of Classification Search
CPC .................................................. C03C 10/0027
USPC .................................................. 428/410, 426
See application file for complete search history.

(56) References Cited

U.S. PATENT DOCUMENTS

| 4,074,992 A | 2/1978 | Voss |
| 4,074,993 A | 2/1978 | Ackerman et al. |
| (Continued) | | |

FOREIGN PATENT DOCUMENTS

| CN | 1594157 A | 3/2005 |
| CN | 104039725 A | 9/2014 |
| (Continued) | | |

OTHER PUBLICATIONS

JP2001348250 English machine translation.*
(Continued)

*Primary Examiner* — Lauren R Colgan
(74) *Attorney, Agent, or Firm* — Oblon, McClelland, Maier & Neustadt, L.L.P.

(57) ABSTRACT

The present invention pertains to a glass for strengthening, that: has an average transmittance of at least 70% when converted to a thickness of 0.8 mm at a wavelength of 380-780 nm; has a haze value of no more than 0.7% when converted to a thickness of 0.8 mm in a C light source; has a Young's modulus of at least 85 GPa; has a fracture toughness value of at least 0.90 MPa·m$^{1/2}$; a thermal conductivity at 20° C. of at least 1.3 W/m·K; and comprises a lithium aluminosilicate crystallized glass.

18 Claims, 2 Drawing Sheets

(56) References Cited

U.S. PATENT DOCUMENTS

| | | | |
|---|---|---|---|
| 4,192,688 A | 3/1980 | Babcock et al. | |
| 4,438,210 A | 3/1984 | Rittler | |
| 4,755,488 A | 7/1988 | Nagashima | |
| 6,472,338 B1* | 10/2002 | Shimatani | C03C 3/11 501/7 |
| 6,593,258 B1 | 7/2003 | Shimatani et al. | |
| 7,476,633 B2* | 1/2009 | Comte | C03C 10/0054 501/7 |
| 7,875,565 B1* | 1/2011 | Pinckney | F41H 5/0407 89/36.02 |
| 8,309,480 B2* | 11/2012 | Fujisawa | C03C 10/0027 501/7 |
| 8,461,068 B2* | 6/2013 | Almoric | C03C 10/0027 65/33.1 |
| 10,626,046 B2* | 4/2020 | Beall | C03C 3/097 |
| 11,267,747 B2* | 3/2022 | Beall | C03C 3/091 |
| 11,274,058 B2* | 3/2022 | Li | C03C 21/002 |
| 2005/0090377 A1 | 4/2005 | Shelestak et al. | |
| 2007/0213192 A1 | 9/2007 | Monique Comte et al. | |
| 2009/0263662 A1 | 10/2009 | Shelestak et al. | |
| 2010/0167903 A1 | 7/2010 | Comte et al. | |
| 2010/0233407 A1 | 9/2010 | Shelestak et al. | |
| 2011/0071011 A1* | 3/2011 | Fujisawa | C03C 3/085 501/68 |
| 2011/0079048 A1 | 4/2011 | Shelestak et al. | |
| 2011/0092353 A1* | 4/2011 | Amin | C03C 10/16 501/3 |
| 2014/0134397 A1* | 5/2014 | Amin | C03C 10/0054 428/141 |
| 2014/0238971 A1 | 8/2014 | Comte et al. | |
| 2014/0357468 A1 | 12/2014 | Siebers et al. | |
| 2015/0274581 A1* | 10/2015 | Beall | C03C 10/0054 501/4 |
| 2015/0376054 A1* | 12/2015 | Beall | C03B 32/02 65/30.14 |
| 2015/0376055 A1* | 12/2015 | Fu | C03C 21/002 501/32 |
| 2016/0122240 A1 | 5/2016 | Oram et al. | |
| 2016/0280589 A1* | 9/2016 | Beall | C03C 4/0092 |
| 2017/0291849 A1* | 10/2017 | Dejneka | C03C 3/093 |
| 2017/0334767 A1 | 11/2017 | Beall et al. | |

FOREIGN PATENT DOCUMENTS

| | | |
|---|---|---|
| CN | 106116143 A | 11/2016 |
| JP | 61-101434 A | 5/1986 |
| JP | 64-52631 A | 2/1989 |
| JP | 3-23237 A | 1/1991 |
| JP | 6-96460 82 | 11/1994 |
| JP | 11-228180 A | 8/1999 |
| JP | 11-228181 A | 8/1999 |
| JP | 2000-44282 A | 2/2000 |
| JP | 2001-316132 A | 11/2001 |
| JP | 2001-348250 A | 12/2001 |
| JP | 2002-154840 A | 5/2002 |
| JP | 2006-330010 A | 12/2006 |
| JP | 2007-527354 A | 9/2007 |
| JP | 2016-529201 A | 9/2016 |
| WO | WO 2016/154235 A1 | 9/2016 |

OTHER PUBLICATIONS

JP2002154840 English machine translation.*
Beall, G.H., et al. "Ion-Exchange in Glass-Ceramics", Frontiers in Materials, Original Research, vol. 3. Aug. 23, 2016, pp. 1-11.
Tian Ying-liang, et al., "New Glass Technology," China Light Industry Press, Jun. 2009, 5 pages (with English Abstract).
International Search Report dated Sep. 11, 2018, in PCT/JP2018/027577, 5 pages (with English translation).
Written Opinion dated Sep. 11, 2018, in PCT/JP2018/027577, 4 pages.
U.S. Appl. No. 16/747,593, filed Jan. 21, 2020.
U.S. Appl. No. 16/747,586, filed Jan. 21, 2020.
"Ordnance Industry Science and Technology Dictionary Optical Engineering", Editorial Board of Ordnance Industry Science and Technology Dictionary, National Defense Industry Press, May 31, 1993, vol. 8—275 page (with English abstract).

* cited by examiner

GLASS FOR CHEMICAL STRENGTHENING, CHEMICALLY STRENGTHENED GLASS, AND ELECTRONIC DEVICE CASE

TECHNICAL FIELD

The present invention relates to a glass for chemical strengthening which is a crystallized glass having high transparency, a chemically strengthened glass, and an electronic device housing using the chemically strengthened glass.

BACKGROUND ART

A chemically strengthened glass is used broadly as a cover glass of an electronic device such as a portable terminal.

The chemically strengthened glass is, for example, a glass which has been brought into contact with molten salt containing alkali metal ions to cause ion exchange between alkali metal ions in the glass and the alkali metal ions in the molten salt to thereby form a compressive stress layer in a surface of the glass.

In recent years, chemically strengthened glasses have been used not only for display surfaces but also for electronic device housings (side faces or bottom faces). When a chemically strengthened glass is used in an electronic device housing, the housing with excellent designability can be obtained by, for example, a method in which colored coating is applied to the inner surface side of the housing.

However, the chemically strengthened glass is lower in thermal conductivity than a metal which has been used conventionally. Therefore, heat generated inside the housing cannot be released easily, and there is a concern that the characteristics of the electronic device tend to deteriorate.

A crystallized glass is a glass in which crystals have been precipitated. In comparison with an amorphous glass containing no crystals, the crystallized glass is hard and not easily scratched. Patent Literature 1 describes an example in which a crystallized glass is chemically strengthened by an ion exchange treatment. However, the crystallized glass is no match for the amorphous glass in terms of transparency. The crystallized glass low in transparency has a limit in terms of its designability.

Patent Literature 2 describes a transparent crystallized glass.

CITATION LIST

Patent Literature

Patent Literature 1: JP-T-2016-529201
Patent Literature 2: JP-A-S64-52631

SUMMARY OF INVENTION

Technical Problem

However, few transparent crystallized glasses have enough high transparency. In addition, the crystallized glass described in Patent Literature 2 has not been subjected to a chemical strengthening or the like. Therefore, the crystallized glass of the Patent Literature 2 is insufficient in strength as an electronic device housing.

The chemical strengthening characteristics of a crystallized glass are strongly influenced by the composition of the glass or crystals precipitated therein. The scratch resistance or the transparency of the crystallized glass is also strongly influenced by the glass composition or the precipitated crystals. Precipitation of suitable crystals is effective in enhancing the thermal conductivity. However, since an excessive precipitation of the crystals decreases the transparency, it is not easy to secure the transparency while improving the thermal conductivity.

The present invention provides a chemically strengthened glass and a glass for chemical strengthening which are excellent in transparency and strength, are hardly scratched, and have high thermal conductivity.

In addition, the present invention provides an electronic device housing using the chemically strengthened glass which is excellent in transparency and strength, is hardly scratched, and has high thermal conductivity.

Solution to Problem

The present invention provides a glass for chemical strengthening, having:

an average transmittance at a wavelength of 380 to 780 nm of 70% or higher in terms of a thickness of 0.8 mm;

a haze value of 0.7% or lower in terms of the thickness of 0.8 mm at a C illuminant;

a Young's modulus of 85 GPa or more;

a fracture toughness value of 0.90 MPa·m$^{1/2}$ or more; and a thermal conductivity at 20° C. of 1.3 W/m·K or more, and including a lithium aluminosilicate crystallized glass.

In addition, the present invention provides a chemically strengthened glass, having:

an average transmittance at a wavelength of 380 to 780 nm of 70% or higher in terms of a thickness of 0.8 mm;

a haze value of 0.7% or lower in terms of the thickness of 0.8 mm at a C illuminant;

a Young's modulus of 85 GPa or more;

a fracture toughness value of 0.90 MPa·m$^{1/2}$ or more;

a thermal conductivity at 20° C. of 1.3 W/m·K or more; and a surface compressive stress of 500 MPa or more, and a depth of a compressive stress layer of 45 µm or more, and including a lithium aluminosilicate crystallized glass.

The present invention provides an electronic device housing member including the chemically strengthened glass.

The present invention provides an electronic device housing in which a surface area of a part formed of the chemically strengthened glass occupies 40% or higher with respect to a surface area of the housing.

Advantageous Effects of Invention

According to the present invention, it is possible to obtain a glass for chemical strengthening and a chemically strengthened glass which are excellent in transparency and strength, are hardly scratched, and have high thermal conductivity. In addition, it is possible to obtain an electronic device housing using the chemically strengthened glass which is excellent in transparency and strength, is hardly scratched, and has high thermal conductivity.

DESCRIPTION OF EMBODIMENTS

The word "to" designating a numerical range in the present description is used as a denotation of a range including numerical values on both sides thereof as a lower limit value and an upper limit value of the range. In the following description, the word "to" will be used in the same meaning unless otherwise indicated.

The phrase "crystallized glass" in the present description designates a glass in which a diffraction peak indicating a crystal can be recognized by a powder X-ray diffraction method. The "crystallized glass" is a glass containing a crystal, which is obtained by heating the "amorphous glass" to precipitate a crystal therein. In the following description, the "amorphous glass" and the "crystallized glass" may be collectively referred to as "glass".

In powder X-ray diffractometry, a region where 2θ is 10° to 80° is measured by using CuKα radiation, and when a diffraction peak appears, a precipitated crystal is identified by a Hanawalt method.

In the following description, the phrase "chemically strengthened glass" designates a glass which has been subjected to a chemical strengthening treatment, and the phrase "glass for chemical strengthening" designates a glass which has not been subjected to a chemical strengthening treatment yet.

In addition, the phrase "base composition of a chemically strengthened glass" designates a composition of a glass which has not been subjected to a chemical strengthening treatment yet, that is, a composition of a glass for chemical strengthening. Unless an immoderate ion exchange treatment is performed, a part deeper than a depth of a compressive stress layer (DOL) in a chemically strengthened glass has the same composition as a base composition of the chemically strengthened glass.

In the present description, any glass composition is expressed by mass % on an oxide basis unless otherwise stated. Mass % will be written as "%" simply.

In addition, the phrase "substantially not contained" in the present description means not to be higher than a level of impurities contained in raw materials etc., that is, not to be intentionally added. Specifically, for example, the phrase means to be lower than 0.1 mass %.

The phrase "visible light transmittance" in the present description designates an average transmittance at a wavelength of 380 nm to 780 nm. In addition, a "haze value" is measured using a C illuminant according to JIS K3761: 2000.

The phrase "fracture toughness value" in the present description designates an indentation fracture method (IF method) fracture toughness value according to JIS R1607: 2010.

The phrase "Vickers hardness" in the present description designates Vickers hardness (HV0.1) according to JIS R1610:2003.

Figure 1:
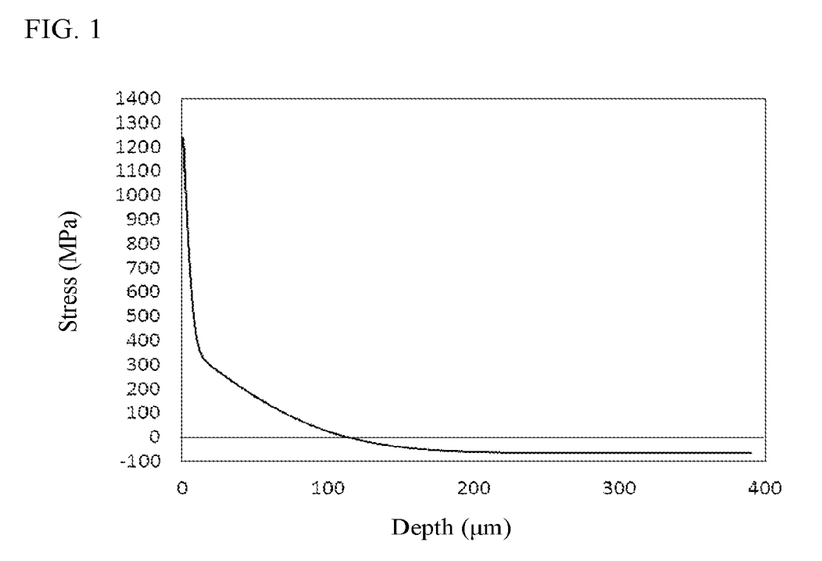
FIG. 1 is a graph showing an example of a stress profile of a chemically strengthened glass.

The phrase "stress profile" in the present description designates a profile showing a compressive stress value with a depth from a glass surface as a variable. FIG. 1 shows an example of a stress profile. In a stress profile, a tensile stress is expressed as a negative compressive stress.

The "compressive stress value" can be measured by thinning a cross section of a glass into a thinned sample and analyzing the thinned sample with a birefringence imaging system. An example of the birefringence imaging system includes Abrio-IM which is a birefringence imaging system made by Tokyo Instruments, Inc. The compressive stress value may be measured by use of scattered-light photoelasticity. In this method, the compressive stress value can be measured by making light incident from a surface of a glass and analyzing polarization of scattered light thereof. An example of a stress meter using scattered-light photoelasticity includes SLP-1000 which is a scattered-light photoelastic stress meter made by Orihara Manufacturing Co., LTD.

The phrase "depth of a compressive stress layer (DOL)" designates a depth where the compressive stress value is zero.

In the following description, the surface compressive stress may be denoted as CS, a compressive stress at a depth of DOL/4 may be denoted as $CS_1$, and a compressive stress at a depth of DOL/2 may be denoted as $CS_2$.

In addition, a depth where the compressive stress value is CS/2 is denoted as $DOL_1$, and $m_1$ expressed by the following expression is regarded as an inclination of the stress profile from the glass surface to the depth $DOL_1$.

$$m_1=(CS-CS/2)/(0-DOL_1)$$

$m_2$ expressed by the following expression is regarded as an inclination of the stress profile from the depth DOL/4 to the depth DOL/2.

$$m_2=(CS_1-CS_2)/(DOL/4-DOL/2)$$

$m_3$ expressed by the following expression is regarded as an inclination of the stress profile from the depth DOL/2 to the depth DOL.

$$m_3=(CS_2-0)/(DOL/2-DOL)$$

The phrase "internal tensile stress (CT)" in the present description designates a tensile stress value at a depth corresponding to ½ of a sheet thickness t.

<Chemically Strengthened Glass>

A chemically strengthened glass according to the present invention (hereinafter also referred to as "strengthened glass of the present invention") will be described first.

The strengthened glass of the present invention is obtained by chemically strengthening a glass for chemical strengthening according to the present invention (hereinafter also referred to as "glass for strengthening of the present invention") which will be described later. The glass for strengthening of the present invention is a lithium aluminosilicate crystallized glass, and the strengthened glass of the present invention is also a lithium aluminosilicate crystallized glass. In addition, it is preferable that the strengthened glass of the present invention contains β-spodumene. The details of the β-spodumene will be described in detail in the section <Glass for chemical strengthening> which will be described later.

The lithium aluminosilicate crystallized glass is a crystallized glass containing $SiO_2$, $Al_2O_3$ and $Li_2O$ as its essential components. The lithium aluminosilicate crystallized glass contains lithium ions which are alkali metal ions with the smallest ion radii. Therefore, the lithium aluminosilicate crystallized glass can be chemically strengthened by an ion exchange treatment using various salts containing other alkali metal ions.

As a whole, crystals contained in the strengthened glass of the present invention are the same as crystals contained in the crystallized glass which has not been strengthened yet. However, the crystals in the vicinity of the surface of the strengthened glass have been influenced by ion exchange. The crystals contained in the crystallized glass will be described later.

Unless an immoderate ion exchange treatment is performed, the strengthened glass of the present invention as a whole has substantially the same composition as the base composition of the strengthened glass of the present invention. Particularly the deepest part from the glass surface often has the same composition as the composition of the glass for strengthening which has not been strengthened yet. The glass composition will be described later.

The surface compressive stress (CS) of the strengthened glass of the present invention is preferably 500 MPa or more, so that the strengthened glass is hardly cracked by deformation such as bending or the like. Therefore the surface compressive stress of the strengthened glass of the present invention is more preferably 600 MPa or more, further preferably 700 MPa or more, and particularly preferably 800 MPa or more.

The depth of a compressive stress layer (DOL) of the strengthened glass of the present invention is preferably 45 μm or more, so that the strengthened glass can be prevented from being easily cracked even if the surface thereof is scratched. Therefore the DOL is more preferably 60 m or more, and further preferably 70 μm or more, and particularly preferably 80 μm or more. Particularly in a case where large scratches are expected to occur during use, it is preferable that the DOL is set at 100 μm or more.

In addition, the maximum depth where the compressive stress value is 50 MPa or more (hereinafter also referred to as "50 MPa depth") is preferably 50 μm or more, since drop strength to asphalt can be enhanced. Therefore the 50 MPa depth is more preferably 60 μm or more, further preferably 80 μm or more, and particularly preferably 90 μm or more.

Here, the drop strength to asphalt can be evaluated by the following dropping-onto-asphalt test.

A glass sheet (120 mm×60 mm×0.8 mm) to be evaluated is likened to a housing bottom face of a smartphone, attached to a box simulating the smartphone, and dropped onto a flat asphalt surface. The total mass of the glass sheet and the box is set at about 140 g.

The test is started at a height of 30 cm. When the chemically strengthened glass sheet is not cracked, the height is increased by 10 cm, and the test is repeated. Thus, the height (in units of cm) at which the glass sheet is cracked is recorded. The series of tests are performed as one set, and 10 sets are repeated. An average height at which the glass sheet is cracked is regarded as "drop height".

The drop height of the strengthened glass of the present invention in the dropping-onto-asphalt test is preferably 100 cm or more.

Four point bending strength of the strengthened glass of the present invention is preferably 800 MPa or more, and more preferably 900 MPa or more.

Here, the four point bending strength is measured by use of 40 mm×5 mm×0.8 mm test pieces with a lower span of 30 mm and an upper span of 10 mm and at a cross head speed of 0.5 mm/min. An average value of 10 test pieces is regarded as the four point bending strength.

In the strengthened glass of the present invention, an inclination $m_1$ of a stress profile from the glass surface to the depth $DOL_1$ is preferably −50 MPa/μm or less, more preferably −55 MPa/μm or less, and even more preferably −60 MPa/μm or less. The chemically strengthened crystallized glass is a crystallized glass having a compressive stress layer formed in its surface. A tensile stress occurs in a part far from the surface. Accordingly, the stress profile thereof has a negative inclination from the surface at a depth of zero toward the inside. Therefore, when $m_1$ is a negative value and absolute value thereof is large, it is possible to obtain a stress profile having a large surface compressive stress (CS) and a small internal tensile stress (CT).

An inclination $m_2$ of the stress profile from a depth of DOL/4 to a depth of DOL/2 has a negative value. The inclination $m_2$ is preferably −5 or more, more preferably −3 or more, and even more preferably −2 or more in order to suppress broken pieces of the strengthened glass from scattering when the strengthened glass is cracked. When $m_2$ is too large, the 50 MPa depth is reduced so that there is a concern that the drop strength to asphalt may be insufficient. In order to increase the 50 MPa depth, $m_2$ is preferably −0.3 or less, more preferably −0.5 or less, and even more preferably −0.7 or less.

In the strengthened glass of the present invention, it is preferable that an inclination $m_3$ of the stress profile from the depth of DOL/2 to a depth of DOL has a negative value. The inclination $m_3$ is preferably −5 or more, more preferably −3 or more, and even more preferably −2 or more in order to suppress broken pieces of the strengthened glass from scattering when the strengthened glass is cracked. When the absolute value of $m_3$ is too small, the 50 MPa depth is reduced so that the strengthened glass tends to be cracked easily when it is scratched. In order to increase the 50 MPa depth, $m_3$ is preferably −0.3 or less, more preferably −0.5 or less, and even more preferably −0.7 or less.

It is preferable that a ratio $m_2/m_3$ between the inclination $m_2$ and the inclination $m_3$ is 2 or less so that a deep DOL and a small internal tensile stress (CT) can be obtained. The ratio $m_2/m_3$ is more preferably 1.5 or less, and even more preferably 1 or less. In order to prevent occurrence of cracks in an end face of the strengthened glass, the ratio $m_2/m_3$ is preferably 0.3 or more, more preferably 0.5 or more, and even more preferably 0.7 or more.

It is preferable that the internal tensile stress (CT) of the strengthened glass of the present invention is 110 MPa or less so that broken pieces can be suppressed from scattering when the chemically strengthened glass is cracked. The CT is more preferably 100 MPa or less, and even more preferably 90 MPa or less. On the other hand, when the CT is reduced, the surface compressive stress (CS) is reduced. Thus, there is a tendency that sufficient strength cannot be obtained easily. Therefore, the CT is preferably 50 MPa or more, more preferably 55 MPa or more, and even more preferably 60 MPa or more.

In the case where the strengthened glass of the present invention has a visible light transmittance of 70% or higher in terms of a thickness is 0.8 mm, when the strengthened glass is used as a side face or a bottom face of a housing, the strength can be enhanced while enhancing the designability by applying a colored coating or the like to the inner surface of the housing.

The visible light transmittance of the strengthened glass of the present invention in terms of the thickness of 0.8 mm is preferably 80% or higher, more preferably 85% or higher, and even more preferably 88% or higher. The higher the visible light transmittance is, the more preferable it is. However, the visible light transmittance is typically 91% or lower. The transmittance of 91% is as high as the transmittance of an amorphous glass. In order to give priority to mechanical strength or thermal conductivity, the visible light transmittance may be 90.5% or lower, or even 90% or lower.

In addition, the haze value of the strengthened glass of the present invention in terms of a thickness of 0.8 mm is preferably 1.5% or lower, more preferably 0.7% or lower, even more preferably 0.6% or lower, further more preferably 0.4% or lower, particularly preferably 0.3% or lower, and extremely preferably 0.2% or lower, in order to enhance designability. The lower the haze value is, the more preferable it is. However, when the crystallinity is reduced or the crystal particle size is reduced in order to reduce the haze value, the mechanical strength or the thermal conductivity deteriorates. Therefore, the haze value is preferably 0.05% or higher, and more preferably 0.1% or higher.

The Vickers hardness of the strengthened glass of the present invention tends to increase owing to a chemical strengthening treatment in comparison with that before the strengthening treatment. It is considered that it is because a compressive stress occurs in crystals owing to ion exchange between small ions in the crystals and large ions in molten salt.

The Vickers hardness of the strengthened glass of the present invention is preferably 700 or more, more preferably 720 or more, even more preferably 740 or more, and further more preferably 780 or more. On the other hand, the Vickers hardness of the strengthened glass of the present invention is typically 950 or less.

Figure 2:
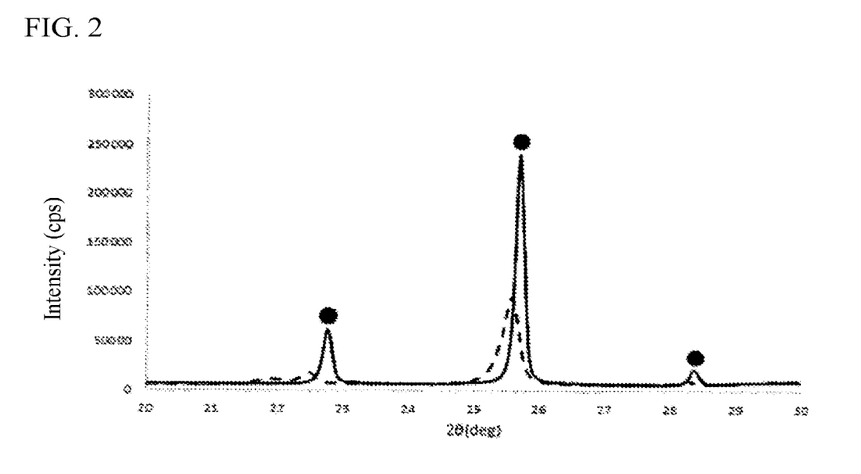
FIG. 2 is a graph showing an example of a powder X-ray diffraction pattern in a crystallized glass.

FIG. 2 shows an X-ray diffraction pattern of a strengthened glass of the present invention and an X-ray diffraction pattern of a crystallized glass (glass for chemical strengthening) which has not been strengthened yet, by way of example. In FIG. 2, the solid line designates an X-ray diffraction pattern measured for a crystallized glass sheet which has not been strengthened yet. Diffraction lines of β-spodumene crystals can be recognized as shown by the black circles in FIG. 2. The broken line designates an X-ray diffraction pattern measured in the crystallized glass sheet which has been chemically strengthened.

It is considered that the reason why the positions of diffraction peaks are shifted to the lower angle side by the chemical strengthening is because the lattice spacing is increased by ion exchange which has occurred between small ions in the crystals and large ions in the molten salt.

However, in comparison between powder X-ray diffraction patterns before and after chemical strengthening, such a shift of a diffraction line could not be recognized. It is considered that this is because a change of the lattice spacing caused by the chemical strengthening treatment occurred only in the vicinity of the surface of the glass sheet but the internal crystals were not changed by the chemical strengthening treatment.

When the strengthened glass of the present invention has a Young's modulus of 85 GPa or more, the strengthened glass shows sufficient rigidity as a housing for an electronic device (electronic device housing) so that internal parts such as a display can be prevented from being easily broken. In addition, the mechanical strength is enhanced. The Young's modulus is preferably 86 GPa or more, and more preferably 88 GPa or more. The higher the Young's modulus is, the more preferable it is. However, the Young's modulus is typically 150 GPa or less. In order to give priority to the optical properties, the Young's modulus is preferably 120 GPa or less, and more preferably 110 GPa or less.

In the case where the strengthened glass of the present invention has a fracture toughness value of 0.90 MPa·m$^{1/2}$ or more, when the strengthened glass is used as a housing for an electronic device, scratches are hardly generated and mechanical strength is excellent. The fracture toughness value is preferably 0.95 MPa·m$^{1/2}$ or more, more preferably 1.0 MPa·m$^{1/2}$ or more, and particularly preferably 1.1 MPa·m$^{1/2}$ or more. The higher the fracture toughness value is, the more preferable it is. However, the fracture toughness value is typically 2.0 MPa·m$^{1/2}$ or less. On the other hand, in a crystallized glass having a high fracture toughness value, plenty of crystals are precipitated and the crystals have large size. Thus, such a crystallized glass tends to be lower in optical properties. In order to enhance the optical properties, the fracture toughness value is preferably 1.6 MPa·m$^{1/2}$ or less, and more preferably 1.4 MPa·m$^{1/2}$ or less.

It is preferable that the Vickers hardness of the strengthened glass of the present invention is 700 or more so that the strengthened glass can be prevented from being easily scratched and can also have excellent abrasion resistance. The Vickers hardness is more preferably 720 or more, even more preferably 740 or more, further more preferably 780 or more, and particularly preferably 800 or more.

The thermal expansion coefficient of the strengthened glass of the present invention is so small that the strengthened glass is excellent in thermal shock resistance, and when the strengthened glass is used as a housing, cracking caused by a local temperature change can be suppressed. The average thermal expansion coefficient at 50° C. to 350° C. in the strengthened glass of the present invention is preferably 30×10$^{-7}$/° C. or less, more preferably 25×10$^{-7}$/° C. or less, even more preferably 20×10$^{-7}$/° C. or less, and particularly preferably 15×10$^{-7}$/° C. or less. It is important that the average thermal expansion coefficient at 50° C. to 350° C. has a small absolute value. When the thermal expansion coefficient has a negative value, it is preferably −20×10$^{-7}$/° C. or more, and more preferably −10×10$^{-7}$/° C. or more.

It is preferable that the density of the strengthened glass of the present invention is 2.45 g/cm$^3$ or more so that the thermal conductivity tends to increase. The density is more preferably 2.47 g/cm$^3$ or more, and particularly preferably 2.49 g/cm$^3$ or more. In order to reduce the weight as an electronic device, the density is preferably 3.0 g/cm$^3$ or less, more preferably 2.8 g/cm$^3$ or less, and particularly preferably 2.65 g/cm$^3$ or less.

The thermal conductivity at 20° C. in the strengthened glass of the present invention is 1.3 W/m·K or more. The thermal conductivity is preferably 1.4 W/m·K or more, and more preferably 1.5 W/m·K or more. Although the upper limit of the thermal conductivity is not particularly limited, it is typically about 3.0 W/m·K or less.

The thermal conductivity can be calculated from specific heat capacity and thermal diffusion factor. The specific heat capacity can be measured by differential scanning calorimetry, and the thermal diffusion factor can be measured by a laser flash method.

<Glass for Chemical Strengthening>

The glass for chemical strengthening according to the present invention (hereinafter also referred to as "glass for strengthening of the present invention") is a lithium aluminosilicate crystallized glass. The glass for strengthening of the present invention can be obtained by heating and crystallizing an amorphous glass which will be described later. Examples of crystals which may be contained as precipitated crystals in the lithium aluminosilicate crystallized glass include lithium aluminosilicate crystals, lithium silicate crystals, and β-quartz crystals. Examples of the lithium aluminosilicate crystals include β-spodumene, virgilite, and petalite. The β-spodumene is preferred. The β-spodumene is a crystal expressed as LiAlSi$_2$O$_6$ and typically showing diffraction peaks at Bragg angles (2θ) of 25.55°±0.050, 22.710±0.050, and 28.20°±0.05° in an X-ray diffraction spectrum.

A crystallized glass containing β-spodumene is preferred because it has excellent chemical strengthening characteristics. In glasses having the same composition, depending on crystallization conditions, β-spodumene is precipitated in some cases, while a β-quartz solid solution is precipitated in some cases. Even in such a case, the surface compressive stress (CS) of the crystallized glass containing β-spodumene tends to increase when it is chemically strengthened, in comparison with that of a crystallized glass containing a β-quartz solid solution or virgilite. Since the β-spodumene has a dense crystal structure, it is considered that a high compressive stress is generated to enhance the chemical strengthening effect when ions in the precipitated crystal are substituted by larger ions owing to an ion exchange treatment for the chemical strengthening.

A crystallized glass containing β-spodumene is also known to have a small thermal expansion coefficient. Owing to the small thermal expansion coefficient, warpage caused by a thermal treatment accompanying the chemical strengthening or the like can be suppressed. In addition, the crystallized glass can be heated or cooled rapidly. Thus, the crystallized glass can be easily handled. The average thermal expansion coefficient at 50° C. to 350° C. in the glass for strengthening of the present invention is preferably $30\times10^{-7}/°$ C. or less, more preferably $25\times10^{-7}/°$ C. or less, even more preferably $20\times10^{-7}/°$ C. or less, and particularly preferably $15\times10^{-7}/°$ C. or less. It is important that the average thermal expansion coefficient at 50° C. to 350° C. has a small absolute value. When the average thermal expansion coefficient has a negative value, it is preferably $-20\times10^{-7}/°$ C. or more, and more preferably $-10\times10^{-7}/°$ C. or more.

A β-spodumene is also known to have a high crystal growth rate. Therefore, a crystal contained in a crystallized glass containing β-spodumene tends to grow. Thus, the crystallized glass tends to be low in transparency and large in haze value. However, the glass for strengthening of the present invention has a large number of very small crystals. Therefore, the glass for strengthening is high in transparency and small in haze value.

The crystallinity of the glass for strengthening of the present invention is preferably 10% or higher, more preferably 15% or higher, even more preferably 20% or higher, and particularly preferably 25% or higher in order to enhance the mechanical strength. In order to enhance the transparency, the crystallinity is preferably 70% or lower, more preferably 60% or lower, and particularly preferably 50% or lower. When the crystallinity is low, the glass for strengthening is also superior at the point that bend forming or the like can be easily performed by heating.

The crystallinity can be calculated from X-ray diffraction intensity by a Rietveld method. The Rietveld method is described in "Handbook of Crystal Analysis" edited by the "Handbook of Crystal Analysis" Editing Committee of the Crystallographic Society of Japan (published by Kyoritsu Shuppan Co., Ltd., 1999, pp. 492-499).

The average particle size of the crystals (precipitated crystals) in the glass for strengthening of the present invention is preferably 300 nm or less, more preferably 200 nm or less, even more preferably 150 nm or less, and particularly preferably 100 nm or less. The average particle size of the precipitated crystals can be calculated from powder X-ray diffraction intensity by a Rietveld method.

Figure 3:
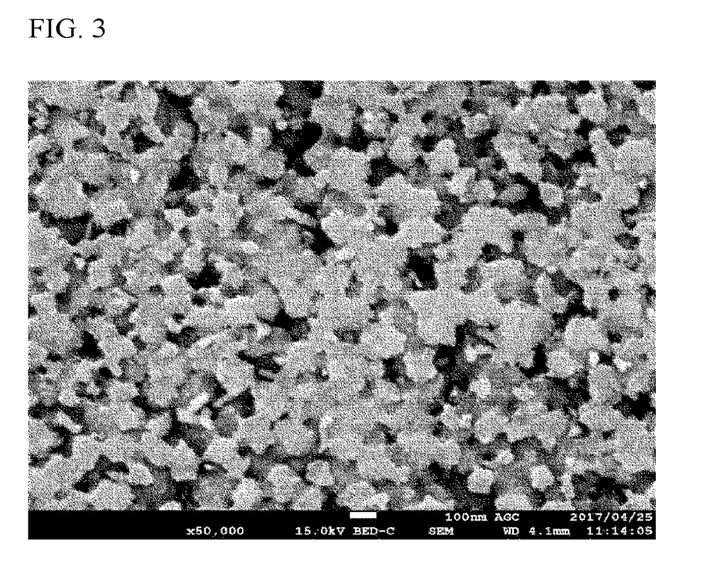
FIG. 3 shows an example of an SEM image of a crystallized glass cross section.

FIG. 3 shows an example of an SEM image in which a section of a crystallized glass polished to be mirror-finished and etched with hydrofluoric acid was observed by a scanning electron microscope (SEM). In the SEM image in FIG. 3, bright parts are precipitated crystals, and dark parts are residual glass-phases.

The composition of the glass for strengthening of the present invention is the same as the composition of an amorphous glass which has not been crystallized yet. Therefore, the composition will be described in the section of the amorphous glass.

The visible light transmittance of the glass for strengthening of the present invention in terms of a thickness of 0.8 mm is preferably 70% or higher, more preferably 80% or higher, even more preferably 85% or higher, and particularly preferably 88% or higher, in order to enhance the transparency of the strengthened glass. The higher the visible light transmittance is, the more preferable it is. However, the visible light transmittance is typically 91% or lower. The transmittance of 91% is as high as the transmittance of an amorphous glass.

In order to give priority to mechanical strength and thermal conductivity, the visible light transmittance may be 90.5% or lower, or even 90% or lower.

In addition, the haze value of the glass for strengthening of the present invention in terms of a thickness of 0.8 mm is preferably 1.5% or lower, more preferably 1.2% or lower, even more preferably 1% or lower, and particularly preferably 0.8% or lower, in order to enhance the transparency of the strengthened glass. Particularly in order to enhance the transparency, the haze value is preferably 0.7% or lower, more preferably 0.6% or lower, further more preferably 0.4% or lower, particularly preferably 0.3% or lower, and extremely preferably 0.2% or lower. In order to improve the external appearance, the lower the haze value is, the more preferable it is. However, when the crystallinity is reduced or the crystal particle size is reduced in order to reduce the haze value, the mechanical strength or the thermal conductivity deteriorates. In order to increase the mechanical strength or the thermal conductivity, the haze value is preferably 0.05% or higher, and more preferably 0.1% or higher.

The Young's modulus of the glass for strengthening of the present invention is preferably 85 GPa or more, more preferably 86 GPa or more, and even more preferably 88 GPa or more in order to increase the Young's modulus of the strengthened glass. The higher the Young's modulus is, the more preferable it is. However, the Young's modulus is typically 150 GPa or less. In order to give priority to the optical properties, the Young's modulus is preferably 120 GPa or less, and more preferably 110 GPa or less.

The fracture toughness value of the glass for strengthening of the present invention is preferably 0.90 MPa·m$^{1/2}$ or more, more preferably 0.95 MPa·m$^{1/2}$ or more, even more preferably 1.0 MPa·m$^{1/2}$ or more, and particularly preferably 1.1 MPa·m$^{1/2}$ or more in order to increase the fracture toughness value of the strengthened glass. The higher the fracture toughness value is, the more preferable it is. However, the fracture toughness value is typically 2.0 MPa·m$^{1/2}$ or less. In order to give more priority to the optical properties, the fracture toughness value is preferably 1.6 MPa·m$^{1/2}$ or less, and more preferably 1.4 MPa·m$^{1/2}$ or less.

It is preferable that the Vickers hardness of the glass for strengthening of the present invention is 680 or more. When the Vickers hardness is 680 or more, the glass can be prevented from being easily scratched and can also have excellent abrasion resistance. The Vickers hardness is preferably 700 or more, more preferably 720 or more, even more preferably 750 or more, and further more preferably 800 or more.

When the glass for strengthening of the present invention is subjected to a chemical strengthening treatment, the Vickers hardness of the strengthened glass tends to be larger than that before the strengthening treatment. It is considered that it is because a compressive stress occurs in crystals owing to ion exchange between small ions in the crystals and large ions in molten salt.

FIG. 2 shows an X-ray diffraction pattern of a glass for strengthening of the present invention and an X-ray diffraction pattern of a strengthened glass, by way of example. In FIG. 2, the solid line designates an X-ray diffraction pattern measured for a crystallized glass sheet which has not been strengthened yet. Diffraction lines of β-spodumene crystals can be recognized as shown by the black circles in FIG. 2. The broken line designates an X-ray diffraction pattern measured in the crystallized glass sheet which has been chemically strengthened. It is considered that the reason why the positions of diffraction peaks are shifted to the lower angle side by the chemical strengthening is because the lattice spacing is increased by ion exchange which has occurred between small ions in the crystals and large ions in the molten salt.

However, when the present inventors compared powder X-ray diffraction patterns before and after chemical strengthening, such a shift of a diffraction line could not be recognized. It is considered that this is because a change of the lattice spacing caused by the chemical strengthening treatment occurs only in the vicinity of the surface of the glass sheet but the internal crystals are not changed by the chemical strengthening treatment.

The thermal conductivity at 20° C. in the glass for strengthening of the present invention is 1.3 W/m·K or more, and is preferably 1.4 W/m·K or more, and more preferably 1.5 W/m·K or more. Although the upper limit of the thermal conductivity is not particularly limited, it is typically about 3.0 W/m·K or less.

The thermal conductivity can be calculated from specific heat capacity and thermal diffusion factor. The specific heat capacity can be, for example, measured by differential scanning calorimetry. The thermal diffusion factor can be, for example, measured by a laser flash method.

<Amorphous Glass>

An amorphous glass which is a glass of before crystallizing a glass for strengthening of the present invention (hereinafter also referred to as "amorphous glass of the present invention") includes, as expressed by mass % on an oxide basis, 58 to 71% of $SiO_2$, 8 to 30% of $Al_2O_3$, 1 to 15% of $Li_2O$, 0 to 5% of $Na_2O$, 0 to 2% of $K_2O$, 0 to 6% of $SnO_2$, 0 to 8% of $ZrO_2$, and 0 to 6% of $P_2O_5$.

This glass composition will be explained below.

In the amorphous glass of the present invention, $SiO_2$ is a component forming a network structure of the glass. In addition, $SiO_2$ is a component enhancing the chemical durability, and it is also a constituent component of lithium aluminosilicate crystals. The content of $SiO_2$ is preferably 58% or higher. The content of $SiO_2$ is more preferably 60% or higher, and even more preferably 64% or higher. On the other hand, in order to enhance the meltability, the content of $SiO_2$ is preferably 71% or lower, more preferably 70% or lower, even more preferably 68% or lower, and particularly preferably 66% or lower.

$Al_2O_3$ is a component effective in increasing a surface compressive stress caused by chemical strengthening. In addition, $Al_2O_3$ is a constituent component of lithium aluminosilicate crystals. Therefore, $Al_2O_3$ is essential. The content of $Al_2O_3$ is preferably 8% or higher. The content of $Al_2O_3$ is more preferably 12% or higher, even more preferably 15% or higher, and particularly preferably 20% or higher. On the other hand, in order to suppress the devitrification temperature of the glass, the content of $Al_2O_3$ is preferably 30% or lower, and more preferably 25% or lower.

$Li_2O$ is a component forming a surface compressive stress by the effect of ion exchange. $Li_2O$ is a constituent component of lithium aluminosilicate crystals. Therefore, $Li_2O$ is essential.

The content of $Li_2O$ is preferably 1% or higher, more preferably 1.5% or higher, even more preferably 2% or higher, and further more preferably 4% or higher. On the other hand, the content of $Li_2O$ is preferably 15% or lower, more preferably 10% or lower, even more preferably 8% or lower, and particularly preferably 6% or lower.

The content ratio $Li_2O/Al_2O_3$ between $Li_2O$ and $Al_2O_3$ is preferably 0.3 or less. When the content ratio $Li_2O/Al_2O_3$ exceeds 0.3, the transparency deteriorates. It is considered that it is because crystallization progresses suddenly during a thermal treatment so that the size of crystals increases.

$Na_2O$ is a component improving the meltability of the glass. $Na_2O$ may be contained. When $Na_2O$ is contained, the content of $Na_2O$ is preferably 0.2% or higher, more preferably 0.5% or higher, and even more preferably 1% or higher. In order to make it easy to precipitate lithium aluminosilicate crystals, the content of $Na_2O$ is preferably 5% or lower, more preferably 4% or lower, and even more preferably 3% or lower.

$K_2O$ is a component decreasing the melting temperature of the glass similarly as $Na_2O$. $K_2O$ may be contained. When $K_2O$ is contained, the content of $K_2O$ is preferably 0.1% or higher, more preferably 0.5% or higher, and even more preferably 1% or higher. In addition, the total content $Na_2O+K_2O$ of $Na_2O$ and $K_2O$ is preferably 0.3% or higher, more preferably 0.5% or higher, even more preferably 1% or higher, and further more preferably 2% or higher.

When $K_2O$ is too rich, lithium aluminosilicate crystals are hardly precipitated. Therefore, the content of $K_2O$ is preferably 2% or lower. In addition, in order to enhance the transparency, the total content $Na_2O+K_2O$ of $Na_2O$ and $K_2O$ is preferably 5% or lower, more preferably 4% or lower, and even more preferably 3% or lower.

$ZrO_2$ is a component forming crystal nuclei during a crystallization treatment. $ZrO_2$ may be contained. When $ZrO_2$ is contained, the content of $ZrO_2$ is preferably 0.5% or higher, and more preferably 1% or higher. On the other hand, when the content of $ZrO_2$ exceeds 8%, the glass tends to be devitrified when it is melted. Thus, there is a concern that the quality of the chemically strengthened glass deteriorates. The content of $ZrO_2$ is preferably 8% or lower, more preferably 6% or lower, and even more preferably 4% or lower.

$SnO_2$ is a component forming crystal nuclei during a crystallization treatment. $SnO_2$ is highly effective in promoting precipitation of β-spodumene crystals. Therefore, $SnO_2$ may be contained. When $SnO_2$ is contained, the content of $SnO_2$ is preferably 1% or higher, and more preferably 1.5% or higher. The content of $SnO_2$ is preferably 6% or lower, so that defects caused by unmelted materials hardly occur in the glass. Therefore, the content of $SnO_2$ is more preferably 5% or lower, and even more preferably 4% or lower.

The total content $SnO_2+ZrO_2$ of $SnO_2$ and $ZrO_2$ is preferably 3% or higher, so that it is considered a large number of $ZrO_2$ nuclei can be formed and the growth of each of the nuclei can be suppressed, whereby the transmittance can be improved. The content $SnO_2+ZrO_2$ is more preferably 4% or higher, even more preferably 5% or higher, particularly preferably 6% or higher, and most preferably 7% or higher. On the other hand, in order to prevent defects caused by unmelted materials from appearing in the glass, the content $SnO_2+ZrO_2$ is preferably 12% or lower, more preferably 10% or lower, even more preferably 9% or lower, and particularly preferably 8% or lower.

When both $SnO_2$ and $ZrO_2$ are contained, the ratio $SnO_2/(SnO_2+ZrO_2)$ of the $SnO_2$ content to the total content of the both is preferably 0.3 or more, more preferably 0.35 or more, and even more preferably 0.45 or more in order to enhance the transparency.

On the other hand, in order to enhance the strength, the ratio $SnO_2/(SnO_2+ZrO_2)$ is preferably 0.7 or less, more preferably 0.6 or less, and even more preferably 0.65 or less.

$TiO_2$ is a component forming crystal nuclei for the crystallized glass. In addition, $TiO_2$ is a component suppressing broken pieces from scattering when the chemically strengthened glass is cracked. Therefore, $TiO_2$ may be contained. When $TiO_2$ is contained, the content of $TiO_2$ is preferably 0.1% or higher, more preferably 0.15% or higher, and even more preferably 0.2% or higher. On the other hand, when the content of $TiO_2$ exceeds 5%, the glass tends to be devitrified when it is melted. Thus, there is a concern that the quality of the chemically strengthened glass deteriorates. The content of $TiO_2$ is preferably 5% or lower, more preferably 3% or lower, and even more preferably 1.5% or lower.

In addition, when a glass containing $Fe_2O_3$ contains $TiO_2$, a composite called an ilmenite composite is formed so that the glass tends to be colored in yellow or brown. $Fe_2O_3$ is normally contained as impurity in any glass. Therefore, in order to prevent coloring, the content of $TiO_2$ is preferably 1% or lower, more preferably 0.5% or lower, even more preferably 0.25% or lower, and particularly preferably substantially not contained.

$P_2O_5$ is not essential, but has an effect of promoting phase separation of the glass to thereby promote crystallization. Therefore, $P_2O_5$ may be contained. When $P_2O_5$ is contained, the content of $P_2O_5$ is preferably 0.1% or higher, more preferably 0.5% or higher, even more preferably 1% or higher, and particularly preferably 2% or higher. On the other hand, when the content of $P_2O_5$ is excessive, broken pieces tend to scatter when the chemically strengthened glass is cracked. In addition, the acid resistance deteriorates conspicuously. The content of $P_2O_5$ is preferably 6% or lower, more preferably 5% or lower, even more preferably 4% or lower, particularly preferably 3% or lower, and extremely preferably 2% or lower. In order to further enhance the acid resistance, it is preferable that $P_2O_5$ is substantially not contained.

$B_2O_3$ is a component improving the chipping resistance of the glass for chemical strengthening or the chemically strengthened glass, and improving the meltability. Therefore, $B_2O_3$ may be contained. Although $B_2O_3$ is not essential, the content of $B_2O_3$, if contained, is preferably 0.5% or higher, more preferably 1% or higher, and even more preferably 2% or higher in order to improve the meltability. On the other hand, when the content of $B_2O_3$ exceeds 5%, striae occur during melting so that the quality of the glass for chemical strengthening tends to deteriorate. Therefore, the content of $B_2O_3$ is preferably 5% or lower. The content of $B_2O_3$ is more preferably 4% or lower, even more preferably 3% or lower, and particularly preferably 1% or lower. In order to enhance the acid resistance, it is preferable that $B_2O_3$ is substantially not contained.

MgO is a component increasing the surface compressive stress of the chemically strengthened glass. MgO is a component preventing broken pieces from easily scattering when the chemically strengthened glass is cracked. Therefore, MgO may be contained. When MgO is contained, the content of MgO is preferably 0.5% or higher, and more preferably 1% or higher. On the other hand, in order to suppress devitrification during melting, the content of MgO is preferably 8% or lower, more preferably 6% or lower, even more preferably 4% or lower, and particularly preferably 3% or lower.

CaO is a component improving the meltability of the glass for chemical strengthening. CaO may be contained in order to prevent devitrification during melting and improve the meltability while suppressing the thermal expansion coefficient from increasing. When CaO is contained, the content of CaO is preferably 0.5% or higher, and more preferably 1% or higher. On the other hand, in order to enhance the ion exchange characteristics, the content of CaO is preferably 4% or lower, more preferably 3% or lower, and particularly preferably 2% or lower.

SrO is a component improving the meltability of the glass for chemical strengthening. In addition, SrO increases the refractive index of the glass so that the refractive index of residual glass phases after crystallization can be made close to the refractive index of precipitated crystals so as to improve the transmittance of the crystallized glass. Therefore, SrO may be contained. When SrO is contained, the content of SrO is preferably 0.1% or higher, more preferably 0.5% or higher, and even more preferably 1% or higher. On the other hand, when the content of SrO is too high, the ion exchange rate decreases. Therefore, the content of SrO is preferably 3% or lower, more preferably 2.5% or lower, even more preferably 2% or lower, and particularly preferably 1% or lower.

BaO is a component improving the meltability of the glass for chemical strengthening. In addition, BaO increases the refractive index of the glass so that the refractive index of residual glass phases after crystallization can be made close to the refractive index of β-spodumene crystals so as to improve the transmittance of the crystallized glass. Therefore, BaO may be contained. When BaO is contained, the content of BaO is preferably 0.1% or higher, more preferably 0.5% or higher, and even more preferably 1% or higher. On the other hand, when the content of BaO is too high, the ion exchange rate decreases. Therefore, the content of BaO is preferably 3% or lower, more preferably 2.5% or lower, even more preferably 2% or lower, and particularly preferably 1% or lower.

ZnO is a component decreasing the thermal expansion coefficient of the glass for chemical strengthening to thereby increase the chemical durability. In addition, ZnO increases the refractive index of the glass so that the refractive index of residual glass phases after crystallization can be made close to the refractive index of β-spodumene crystals so as to improve the transmittance of the crystallized glass. Therefore, ZnO may be contained. When ZnO is contained, the content of ZnO is preferably 0.5% or higher, more preferably 1% or higher, even more preferably 1.5% or higher, and particularly preferably 2% or higher. On the other hand, in order to suppress devitrification during melting, the content of ZnO is preferably 4% or lower, more preferably 3% or lower, and even more preferably 2% or lower.

Each of $Y_2O_3$, $La_2O_3$, $Nb_2O_5$ and $Ta_2O_5$ is a component suppressing broken pieces from scattering when the chemically strengthened glass is cracked. The components may be contained to increase the refractive index. When those components are contained, the total content $Y_2O_3+La_2O_3+Nb_2O_5$ of $Y_2O_3$, $La_2O_3$ and $Nb_2O_5$ is preferably 0.5% or higher, more preferably 1% or higher, even more preferably 1.5% or higher, and particularly preferably 2% or higher. On the other hand, in order to prevent the glass from being easily devitrified when melted, the content $Y_2O_3+La_2O_3+Nb_2O_5$ is preferably 4% or lower, more preferably 3% or lower, even more preferably 2% or lower, and particularly preferably 1% or lower.

The total content $Y_2O_3+La_2O_3+Nb_2O_5+Ta_2O_5$ of $Y_2O_3$, $La_2O_3$, $Nb_2O_5$ and $Ta_2O_5$ is preferably 0.5% or higher, more preferably 1% or higher, even more preferably 1.5% or higher, and particularly preferably 2% or higher. On the other hand, in order to prevent the glass from being easily devitrified when melted, the content $Y_2O_3+La_2O_3+Nb_2O_5+Ta_2O_5$ is preferably 4% or lower, more preferably 3% or lower, even more preferably 2% or lower, and particularly preferably 1% or lower.

In addition, $CeO_2$ may be contained. $CeO_2$ has an effect of oxidizing the glass. When a large amount of $SnO_2$ is contained, $CeO_2$ may suppress $SnO_2$ from being reduced to SnO which is a coloring component. Thus, $CeO_2$ may suppress coloring. When $CeO_2$ is contained, the content of $CeO_2$ is preferably 0.03% or higher, more preferably 0.05% or higher, and even more preferably 0.07% or higher. When $CeO_2$ is used as an oxidizer, too much $CeO_2$ makes it easy to color the glass. Therefore, the content of $CeO_2$ is preferably 1.5% or lower and more preferably 1.0% or lower in order to enhance the transparency.

Further, coloring components may be added to the extent of not impeding the attainment of desired chemical strengthening characteristics. Preferred examples of the coloring components include $Co_3O_4$, $MnO_2$, $Fe_2O_3$, NiO, CuO, $Cr_2O_3$, $V_2O_5$, $Bi_2O_3$, $SeO_2$, $Er_2O_3$, and $Nd_2O_3$.

The total content of the coloring components is preferably 1% or lower. In order to further increase the visible light transmittance of the strengthened glass, it is preferable that those components are substantially not contained.

$SO_3$, chlorides, fluorides, etc. may be contained properly as refining agents during melting of the glass. It is preferable that $As_2O_3$ is not contained. When $Sb_2O_3$ is contained, the content of $Sb_2O_3$ is preferably 0.3% or lower, more preferably 0.1% or lower, and most preferably substantially not contained.

<Method for Manufacturing Chemically Strengthened Glass>

The strengthened glass of the present invention is manufactured as follows. That is, the aforementioned amorphous glass is subjected to a heating treatment to manufacture a glass for strengthening of the present invention, and the obtained glass for strengthening is subjected to a chemical strengthening treatment.

(Manufacturing of Amorphous Glass)

The amorphous glass can be, for example, manufactured in the following method. The following manufacturing method is an example in which a sheet-like amorphous glass is manufactured.

Glass raw materials are prepared to obtain a glass having a desired composition. The glass raw materials are heated and melted in a glass melting furnace. After that, the molten glass is homogenized by bubbling, stirring, addition of a refining agent, etc., and formed into a glass sheet with a predetermined thickness by a known forming method, followed by annealing. Alternatively, the molten glass may be formed into a sheet by a method in which the molten glass is formed into a block, annealed, and then cut.

Examples of the method for forming the sheet-like glass include a float process, a press process, a roll-out process, a fusion process, and a down draw process. Particularly when a large-size glass sheet is manufactured, the float process is preferred. Alternatively, a continuously forming method other than the float process, for example, the roll-out process, the fusion process and the down draw process are also preferred. The strengthened glass of the present invention tends to precipitate crystals therein when it is formed. Therefore, in order to suppress the precipitation of crystals during forming, it is preferable to manufacture the glass sheet by the roll-out process.

(Crystallization Treatment)

The glass for strengthening of the present invention which is a crystallized glass is obtained by performing a heating treatment on the amorphous glass obtained in the aforementioned procedure.

The heating treatment for crystallization is preferably a two-step heating treatment in which the temperature is increased from a room temperature to a first treatment temperature and retained for a predetermined time, and the temperature is then increased to a second treatment temperature which is higher than the first treatment temperature, and retained for a predetermined time.

When the two-step heating treatment is used, the first treatment temperature is preferably within a temperature range in which a production rate of crystal nuclei is increased in the glass composition, and the second treatment temperature is preferably within a temperature range in which a growth rate of crystals is increased in the glass composition. In addition, the time for which the first treatment temperature is retained is preferably long enough to allow a sufficient number of crystal nuclei to grow. When a large number of crystal nuclei are produced, the size of each crystal can be reduced. Thus, it is possible to obtain a crystallized glass having high transparency.

The first treatment temperature is, for example, 550° C. to 800° C., and the second treatment temperature is for example, 850° C. to 1,000° C. The glass is retained at the first treatment temperature for 2 hours to 10 hours, and then retained at the second treatment temperature for 2 hours to 10 hours.

The crystallized glass obtained in the aforementioned procedure is ground and polished if necessary. Thus, a crystallized glass sheet is formed. In the case where the crystallized glass sheet is cut into a predetermined shape and size, or chamfered, it is preferable that cutting or chamfering is performed before a chemical strengthening treatment so that a compressive stress layer can be also formed in end faces by the chemical strengthening treatment.

(Chemical Strengthening Treatment)

The chemical strengthening treatment is a treatment in which the glass is brought into contact with the metal salt by a method, for example, immersing the glass into a melt of the metal salt (such as potassium nitrate) containing metal ions (typically Na ions or K ions) having large ionic radii, so that metal ions (typically Na ions or Li ions) having small ionic radii in the glass are replaced by the metal ions (typically Na ions or Ki ions for the Li ions, and K ions for the Na ions) having large ionic radii.

In order to increase the rate of the chemical strengthening treatment, it is preferable to use "Li—Na exchange" in which Li ions in the glass are replaced by Na ions. On the other hand, in order to form a large compressive stress by the ion exchange, it is preferable to use "Na—K exchange" in which Na ions in the glass are replaced by K ions.

Examples of the molten salt for the chemical strengthening treatment include nitrates, sulfates, carbonates, and chlorides. Among them, examples of the nitrates include lithium nitrate, sodium nitrate, potassium nitrate, cesium nitrate, and silver nitrate. Examples of the sulfates include lithium sulfate, sodium sulfate, potassium sulfate, cesium sulfate, and silver sulfate. Examples of the carbonates include lithium carbonate, sodium carbonate, and potassium carbonate. Examples of the chlorides include lithium chloride, sodium chloride, potassium chloride, cesium chloride, and silver chloride. Each of those molten salts may be used alone, or a plurality of kinds of them may be used in combination.

As for the treatment conditions of the chemical strengthening treatment, time, temperature, etc. are selected suitably in consideration of the glass composition, the kind of molten salt, etc.

It is preferable that the strengthened glass of the present invention is, for example, obtained by the following two-step chemical strengthening treatment.

First, the crystallized glass of the present invention is immersed in metal salt containing Na ions (such as sodium nitrate) at about 350 to 500° C. for about 0.1 to 10 hours. Thus, ion exchange occurs between the Li ions in the crystallized glass and the Na ions in the metal salt so that a compressive stress layer can be formed. For example, the compressive stress layer has a surface compressive stress of 200 MPa or more and a depth of a compressive stress layer of 80 μm or more. On the other hand, when the surface compressive stress exceeds 1,000 MPa, it is difficult to increase the DOL while keeping the CT low. The surface compressive stress after the first-step treatment is preferably 900 MPa or less, more preferably 700 MPa or less, and even more preferably 600 MPa or less.

Next, the glass is immersed in metal salt containing K ions (such as potassium nitrate) at about 350 to 500° C. for about 0.1 to 10 hours. Thus, a large compressive stress occurs in, of the compressive stress layer formed in the previous treatment, for example, a part within a depth range of about 10 μm or less.

According to such a two-step treatment, it is possible to easily obtain a preferable stress profile with a surface compressive stress (CS) of 600 MPa or more.

As for the chemical strengthening treatment, the glass may be immersed in the metal salt containing K ions after the glass is first immersed in the metal salt containing Na ions and then retained at 350 to 500° C. in the atmosphere for 1 to 5 hours. The retention temperature is preferably 425° C. to 475° C., and more preferably 440° C. to 460° C.

When the glass is retained at the high temperature in the atmosphere, the Na ions introduced into the glass from the metal salt by the first-step treatment are thermally diffused in the glass. Thus, a more preferable stress profile can be formed to thereby enhance the drop strength to asphalt.

Alternatively, after the glass is immersed in the metal salt containing Na ions, instead of being retained in the atmosphere, the glass may be immersed in metal salt containing Na ions and Li ions (such as mixture salt of sodium nitrate and lithium nitrate) at 350 to 500° C. for 0.1 to 20 hours.

When the glass is immersed in the metal salt containing Na ions and Li ions, ion exchange occurs between the Na ions in the glass and the Li ions in the metal salt. Thus, a more preferable stress profile can be formed to thereby enhance the drop strength to asphalt.

When such a two-step or three-step strengthening treatment is performed, the total treatment time is preferably 10 hours or less, more preferably 5 hours or less, and even more preferably 3 hours or less in terms of production efficiency. On the other hand, in order to obtain a desired stress profile, the total treatment time is preferably 0.5 hours or more, and more preferably 1 hour or more.

The strengthened glass of the present invention is not only excellent in strength and transparency but also excellent in thermal conductivity. Therefore, the strengthened glass of the present invention is useful as a material for a housing of an electronic device (electronic device housing member). The electronic device housing is, for example, a housing of a mobile device such as a cellular phone or a smartphone.

<Electronic Device Housing>

The electronic device housing according to the present invention is constituted by use of an electronic device housing member including the strengthened glass of the present invention.

Figure 4:
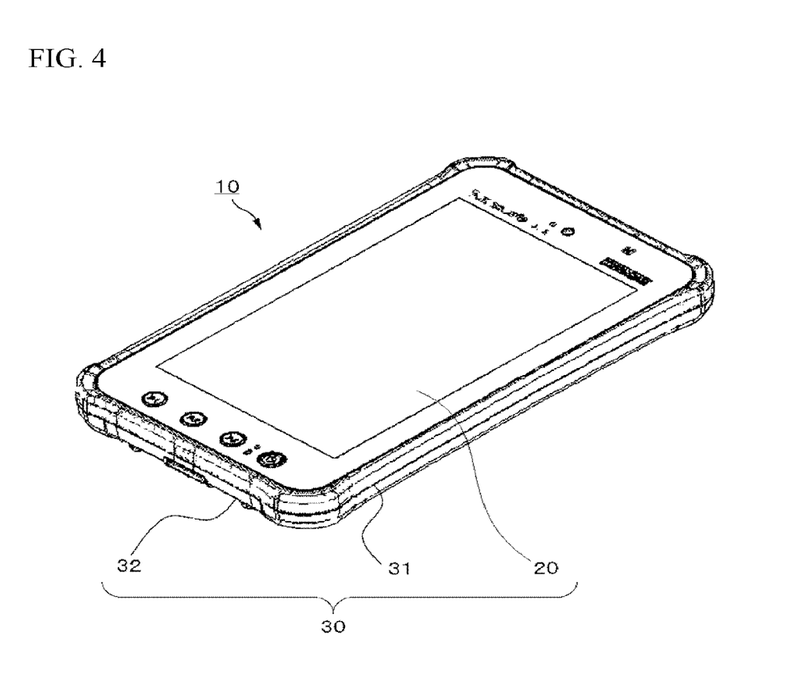
FIG. 4 is a view showing an example of an electronic device housing.

FIG. 4 shows an example of an electronic device using the strengthened glass according to the present invention. The electronic device housing according to the present invention will be described below with reference to FIG. 4. However, the present invention is not limited thereto.

An electronic device 10 shown in FIG. 4 is a portable terminal, which includes a cover glass 20 and a housing 30. FIG. 4 also includes a side face 31 and a bottom face 32 of the housing 30.

When the strengthened glass of the present invention is used in the electronic device, it is preferable that the surface area covered with the strengthened glass of the present invention is 40% or higher of the surface area of the housing so that heat dissipation can be enhanced. It is preferable that more than half of the surface excluding side faces is covered with the strengthened glass of the present invention. The area covered with the strengthened glass of the present invention is more preferably 50% or higher, even more preferably 60% or higher, and particularly preferably 80% or higher.

When the strengthened glass of the present invention is used as the electronic device housing, it is preferable that the thickness of the thinnest part of the strengthened glass of the present invention is 0.6 mm or less. When the thin part is provided, the heat dissipation can be further enhanced. The thickness of the thinnest part is more preferably 0.5 mm or less, and even more preferably 0.4 mm or less.

EXAMPLES

The present invention will be described along its examples below. However, the present invention is not limited thereto. Examples 1 to 4 are Working Examples, and Examples 5 and 6 are Comparative Examples.

Glass raw materials were prepared to have a glass composition shown by mass % on an oxide basis in Table 1, and weighed to obtain a glass having a weight of 800 g. Next, the mixed glass raw materials were put into a platinum crucible, and transferred into an electric furnace at 1,500 to 1,700° C. Thus, the glass raw materials were melted, degassed and homogenized for about 5 hours.

The obtained molten glass was poured into a mold, and retained at a temperature as high as a glass transition point for 1 hour. After that, the molten glass was cooled down to a room temperature at a rate of 0.5° C./min. Thus, a glass block was obtained.

(Glass Transition Point)

Based on JIS R1618:2002, a thermal expansion curve was obtained with a heating rate set at 10° C./min by use of a thermal dilatometer (TD5000SA made by Bruker AXS GmbH.). In addition, a glass transition point Tg (in units of ° C.) was obtained from the obtained thermal expansion curve. Blanks in the table designate unmeasured items.

TABLE 1

| Glass composition | Example 1 Glass 1 | Example 2 Glass 2 | Example 3 Glass 3 | Example 4 Glass 4 | Example 5 Glass 5 | Example 6 Glass 6 |
|---|---|---|---|---|---|---|
| $SiO_2$ | 65.4 | 63.9 | 63.9 | 66.1 | 73.6 | 69.3 |
| $Al_2O_3$ | 22.4 | 20.9 | 22.4 | 21.0 | 7.6 | 12.7 |
| $Li_2O$ | 4.3 | 4.3 | 4.3 | 1.9 | 11.2 | 3.9 |
| $Na_2O$ | 2.0 | 2.0 | 2.0 | 0.5 | 1.6 | 5.6 |
| $K_2O$ | 0.0 | 0.0 | 0.0 | 0.0 | 0.0 | 1.5 |
| $ZrO_2$ | 2.3 | 3.8 | 2.3 | 4.8 | 3.7 | 2.0 |
| $SnO_2$ | 2.1 | 3.6 | 2.1 | 0.0 | 0.0 | 0.0 |
| $TiO_2$ | 0.0 | 0.0 | 0.0 | 0.0 | 0.0 | 0.1 |
| $P_2O_5$ | 1.5 | 1.5 | 3.0 | 0.0 | 2.1 | 0.0 |
| $B_2O_3$ | 0.0 | 0.0 | 0.0 | 0.0 | 0.2 | 0.0 |
| ZnO | 0.0 | 0.0 | 0.0 | 0.0 | 0.0 | 0.0 |
| MgO | 0.0 | 0.0 | 0.0 | 5.7 | 0.0 | 4.7 |
| CaO | 0.0 | 0.0 | 0.0 | 0.0 | 0.0 | 0.2 |
| $Na_2O + K_2O$ | 2.0 | 2.0 | 2.0 | 0.5 | 1.6 | 7.1 |
| Tg | 739 | 730 | | | | 549 |

<Crystallized Glass>

As for each of Glasses 1 to 5, the obtained glass block was processed into a dimensions of 50 mm×50 mm×1.5 mm, and a thermal treatment was then performed thereon under the conditions shown in Table 2. Thus, each crystallized glass (Example 1 to Example 5) was obtained. In the line of crystallization conditions in the table, for example, the case in which 750° C.-4 h is written in the upper stage and 920° C.-4 h is written in the lower stage means that the glass block was retained at 750° C. for 4 hours and then retained at 920° C. for 4 hours.

The obtained crystallized glass was processed, polished and mirror-finished. Thus, a crystallized glass sheet having a thickness (t) of 0.8 mm was obtained. In addition, a rod-like sample for measuring a thermal expansion coefficient was prepared. A part of the remaining crystallized glass was pulverized and used for analyzing precipitated crystals.

(Thermal Expansion Coefficient)

Based on JIS R1618:2002, an average thermal expansion coefficient (in units of $\times 10^{-7}/°$ C.) at 50° C. to 350° C. was measured by use of a thermal dilatometer (TD5000SA made by Bruker AXS GmbH.). The heating rate was set at 10° C./min. Results are shown in Table 2, in which blanks designate unmeasured items.

(Precipitated Crystals: Powder X-Ray Diffraction Measurement)

Powder X-ray diffraction was measured under the following conditions to identify precipitated crystals. In addition, crystallinity (degree of crystallization) (in units of %) and crystal particle size (crystal size) (in units of nm) were calculated by use of a Rietveld method. Results are shown in Table 2, in which blanks designate unmeasured items. In "main crystal" in the table, βSP designates β-spodumene, βQ designates β-quartz, P designates petalite, and LD designates lithium disilicate.

Measurement Apparatus: SmartLab made by Rigaku Corporation
　Used X-rays: CuKα radiation
　Measurement Range: 2θ=10° to 80°
　Speed: 10°/min
　Step: 0.02°

(Precipitated Crystals: SEM Observation)

A surface of the crystallized glass in Example 1 was etched with a 5% HF aqueous solution for 1 minute. A backscattered electron image of the surface was observed by a scanning electron microscope (SEM). The SEM image is shown in FIG. 4.

(Density and Young's Modulus)

Density was measured by an Archimedes method, and Young's modulus was measured by an ultrasonic pulse method. Results are shown in Table 2, in which blanks designate unmeasured items.

(Transmittance and Haze Value)

An average transmittance (in units of %) at a wavelength of 380 to 780 nm was measured by a spectrophotometer (LAMBDA950 made by PerkinElmer, Inc.). Results are shown in Table 2, in which blanks designate unmeasured items.

(Haze Value)

A haze value (in units of %) at a C illuminant was measured by a haze meter (HZ-2 made by Suga Test Instruments Co., Ltd.). Results are shown in Table 2, in which blanks designate unmeasured items.

(Vickers Hardness)

Vickers hardness was measured by pressing an indenter at a load of 100 gf for 15 seconds by use of a Shimadzu micro-Vickers hardness tester (HMV-2 made by Shimadzu Corporation). Incidentally, Vickers hardness was measured in the same manner as to a chemically strengthened glass subjected to a chemical strengthening treatment which will be described later. Results are shown in Table 2, in which blanks designate unmeasured items.

<Strengthened Glass>

Each of Examples 1 to 3 was immersed in molten salt of sodium nitrate at 450° C. for 30 minutes, and then immersed in molten salt of potassium nitrate at 450° C. for 30 minutes. Thus, chemical strengthening was performed.

Example 4 was immersed in mixture salt of lithium sulfate and potassium sulfate (in which the mass ratio between the lithium sulfate and the potassium sulfate was 90:10) at 740° C. for 240 minutes. Thus, chemical strengthening was performed.

Example 5 was immersed in sodium nitrate at 430° C. for 2 hours, and then immersed in potassium nitrate at 430° C. for 2 hours. Thus, chemical strengthening was performed.

Example 6 was not chemically strengthened.

Each of the obtained strengthened glasses was evaluated as to the following characteristics.

(Stress Profile)

A stress value was measured using a surface stress meter FSM-6000 made by Orihara Manufacturing Co., LTD, and a measuring device SLP1000 made by Orihara Manufacturing Co., LTD utilizing scattered-light photoelasticity. Thus, a compressive stress value (CS) (in units of MPa) in the glass surface, a depth (DOL) (in units of μm) where the compressive stress value was zero, an internal tensile stress (CT), and a maximum depth (50 MPa depth) (in units of μm) where the compressive stress value was 50 MPa or more were read out. In addition, inclinations $m_1$, $m_2$ and $m_3$ of the stress profile were calculated. Results are shown in Table 2, in which blanks designate unmeasured items. In addition, the stress profile of the chemically strengthened glass of Example 1 is shown in FIG. 1.

(Four Point Bending Strength)

As for each of the obtained chemically strengthened glasses, bending strength (in units of MPa) was measured by a four point bending test under the conditions of a lower span of 30 mm, an upper span of 10 mm and a cross head speed of 0.5 mm/min. Results are shown in Table 2, in which blanks designate unmeasured items.

(Dropping-onto-Asphalt Test)

The chemically strengthened glass was processed into a sheet having dimensions of 120 mm×60 mm×0.8 mm, and attached to a housing simulating a smartphone, on which the aforementioned dropping-onto-asphalt test was performed. Drop heights (drop test strength) (in units of cm) were shown in Table 2, in which blanks designate unmeasured items.

(Fracture Toughness Value)

Based on JIS R1607:2010, a fracture toughness value was obtained by an indentation fracture method (IF method) using a Vickers hardness tester (FM-ARS 9000 made by Future-Tech Corp.). Indentation was performed at a load of 3 kgf in an atmosphere at a temperature of 22° C. and a humidity of 40%. In consideration of influence of low-speed crack growth, an indentation length was measured in the same atmosphere after 20 minutes from the indentation. Measurement was performed at 10 points for each sample, and an average value was calculated. The average value was regarded as the IF method fracture toughness value (in units of MPa·m$^{1/2}$). Results are shown in Table 2, in which blanks designate unmeasured items.

(Thermal Conductivity)

The crystallized glass was processed to have a diameter of 5 mm and a thickness of 1.44 mm, and a specific heat capacity thereof was measured by a differential scanning calorimeter (DSC 404 F3 made by Netzsch). In addition, the crystallized glass was processed to have a diameter of 5 mm and a thickness of 1 mm, and a thermal diffusion factor thereof was measured by a laser flash method thermophysical property measuring device (LFA-502 made by Kyoto Electronics Manufacturing Co., Ltd.). From the results of the two measurements, thermal conductivity (in units of W/m·K) at a temperature of 20° C. was calculated. Results are shown in Table 2, in which blanks designate unmeasured items.

TABLE 2

| Glass composition | Example 1 Glass 1 | Example 2 Glass 2 | Example 3 Glass 3 | Example 4 Glass 4 | Example 5 Glass 5 | Example 6 Glass 6 |
|---|---|---|---|---|---|---|
| Crystallization conditions | 750° C.-4 h 920° C.-4 h | 750° C.-4 h 910° C.-4 h | 750° C.-4 h 900° C.-4 h | 820° C.-4 h 875° C.-4 h | 540° C.-4 h 600° C.-4 h 710° C.-4 h | Non |
| Expansion coefficient | 12 | 12 | | | | 72 |
| Main crystal | βSP | βSP | βSP | βQ | P,LD | Amorphous |
| Degree of crystallization | 25 | | | | | |
| Crystal size | 55 | | | | | |
| Density | 2.492 | 2.506 | 2.469 | 2.600 | | 2.449 |
| Young's modulus | 88 | 88 | 86 | 98 | 105 | 84 |
| Transmittance | 89 | 89 | 91 | 85 | 90 | |
| Haze | 0.5 | 0.3 | 0.35 | 0.4 | 0.2 | |
| Vickers hardness before strengthening (HV0.1) | 780 | 730 | 785 | 830 | 820 | 630 |
| Vickers hardness after strengthening (HV0.1) | 830 | 820 | 844 | 1040 | 730 | 680 |
| CS | 1135 | 1325 | 1046 | 590 | 340 | 950 |
| DOL | 110 | 119 | 124 | 50 | 160 | 130 |
| CT | 65 | | | | | |
| $m_1$ | −104 | | | | | |
| $m_2$ | −4.0 | | | | | |
| $m_3$ | −3.0 | | | | | |
| 50 MPa depth | 95 | 100 | 90 | | 45 | 75 |
| Four point bending strength | 950 | | | | | |
| Drop test strength | 180 | | | 145 | | |
| Fracture toughness value | 1.2 | 1.2 | | 1.0 | 0.8 | |
| Thermal conductivity | 1.48 | 1.48 | 1.46 | 1.57 | | 1.17 |

In the crystallized glass of Example 1, owing to chemical strengthening, the CS is large, the DOL is large, and the maximum depth where the compressive stress value is 50 MPa or more is also large. Therefore, the crystallized glass shows high strength in the dropping-onto-asphalt test.

In comparison between Examples 1 to 4 and Example 6, it is confirmed that Example 6 which is amorphous has a low thermal conductivity while each crystallized glass has a high thermal conductivity. In addition, in each of Example 1 to Example 5, which is a crystallized glass, the Young's modulus is high to be 85 GPa or more, and the Vickers hardness after the chemical strengthening treatment is high to be 700 or more. The crystallized glass is thus excellent in mechanical properties.

In addition, in comparison between Example 1 to Example 4 with one another, it is confirmed that the thermal conductivity can be controlled by precipitated crystals or density.

In comparison between Examples 1 and 2 and Examples 4 and 5, it is confirmed that a crystallized glass containing β-spodumene has a large fracture toughness value.

Each of the crystallized glasses of Examples 1 to 4 is so high in thermal conductivity that the crystallized glass will not impair characteristics of an electronic device even when the crystallized glass occupies a major part of a surface of the electronic device. Further, the crystallized glass has excellent mechanical characteristics and chemical strengthening characteristics so that the crystallized glass can be used as an electronic device housing with sufficient strength even if the crystallized glass is thinned to promote heat dissipation.

Although the present invention has been described in detail with reference to its specific embodiments, it is obvious for those skilled in the art that various changes or modifications can be made without departing from the spirit and scope of the present invention. The present application is based on a Japanese patent application (Patent Application No. 2017-144868) filed on Jul. 26, 2017, a Japanese patent application (Patent Application No. 2018-002200) filed on Jan. 10, 2018, and a Japanese patent application (Patent Application No. 2018-006451) filed on Jan. 18, 2018, the contents of which are incorporated by reference.

REFERENCE SIGNS LIST

10 Electronic device
20 Cover glass
30 Housing
31 Side face
32 Bottom face

The invention claimed is:

1. A glass for chemical strengthening, comprising a lithium aluminosilicate crystallized glass, and comprising, as expressed by mass % on an oxide basis:
58 to 71% of $SiO_2$;
8 to 30% of $Al_2O_3$;
1 to 15% of $Li_2O$;
1 to 5% of $Na_2O$;
0 to 2% of $K_2O$;
0 to 6% of $SnO_2$;
0 to 8% of $ZrO_2$;
0 to 6% of $P_2O_5$;
0 to 1% of BaO; and
0 to 2% of ZnO,
a total of $SnO_2$ and $ZrO_2$ being 4 to 12%,
wherein the glass for chemical strengthening is free of $As_2O_3$ and $Sb_2O_3$, and
the glass for chemical strengthening has:
an average transmittance at a wavelength of 380 to 780 nm of 70% or higher in terms of a thickness of 0.8 mm;
a haze value of 0.7% or lower in terms of the thickness of 0.8 mm at a C illuminant;
a Young's modulus of 85 GPa or more;
a fracture toughness value of 0.90 MPa·m$^{1/2}$ or more; and
a thermal conductivity at 20° C. of 1.3 W/m·K or more.

2. The glass for chemical strengthening according to claim 1, having a Vickers hardness of 680 or more.

3. The glass for chemical strengthening according to claim 1, wherein the crystallized glass comprises a β-spodumene.

4. The glass for chemical strengthening according to claim 1, comprising, as expressed by mass % on an oxide basis:
60 to 70% of $SiO_2$,
12 to 25% of $Al_2O_3$;
1.5 to 10% of $Li_2O$;
1 to 4% of $Na_2O$;
0 to 5% of $SnO_2$;
0 to 6% of $ZrO_2$; and
0 to 5% of $P_2O_5$.

5. The glass for chemical strengthening according to claim 1, which is free of BaO.

6. The glass for chemical strengthening according to claim 1, which is free of $K_2O$.

7. The glass for chemical strengthening according to claim 1, which is free of $TiO_2$.

8. The glass for chemical strengthening according to claim 1, having the haze value of 0.4% or lower.

9. The glass for chemical strengthening according to claim 1, wherein a content ratio $Li_2O/Al_2O_3$ between $Li_2O$ and $Al_2O_3$ is 0.3 or less.

10. The glass for chemical strengthening according to claim 1, wherein a ratio $SnO_2/(SnO_2+ZrO_2)$ of the $SnO_2$ content to the total of $SnO_2$ and $ZrO_2$ is 0.3 to 0.7.

11. A chemically strengthened glass, comprising a lithium aluminosilicate crystallized glass, and comprising, as expressed by mass % on an oxide basis:
58 to 71% of $SiO_2$;
8 to 30% of $Al_2O_3$;
1 to 15% of $Li_2O$;
1 to 5% of $Na_2O$;
0 to 2% of $K_2O$;
0 to 6% of $SnO_2$;
0 to 8% of $ZrO_2$;
0 to 6% of $P_2O_5$;
0 to 1% of BaO; and
0 to 2% of ZnO,
a total of $SnO_2$ and $ZrO_2$ being 4 to 12%,
wherein the glass for chemical strengthening is free of $As_2O_3$ and $Sb_2O_3$, and
the glass for chemical strengthening has:
an average transmittance at a wavelength of 380 to 780 nm of 70% or higher in terms of a thickness of 0.8 mm;
a haze value of 0.7% or lower in terms of the thickness of 0.8 mm at a C illuminant;
a Young's modulus of 85 GPa or more;
a fracture toughness value of 0.90 MPa·m$^{1/2}$ or more;
a thermal conductivity at 20° C. of 1.3 W/m·K or more; and
a surface compressive stress of 500 MPa or more, and a depth of a compressive stress layer of 45 μm or more.

12. The chemically strengthened glass according to claim 11, having a Vickers hardness of 700 or more.

13. The chemically strengthened glass according to claim 11, wherein the crystallized glass comprises a β-spodumene.

14. The chemically strengthened glass according to claim 11, comprising, as expressed by mass % on an oxide basis:
60 to 70% of $SiO_2$,
12 to 25% of $Al_2O_3$;
1.5 to 10% of $Li_2O$;
1 to 4% of $Na_2O$;
0 to 5% of $SnO_2$;
0 to 6% of $ZrO_2$; and
0 to 5% of $P_2O_5$.

15. The chemically strengthened glass according to claim 11, wherein the depth of a compressive stress layer is 60 μm or more, and a maximum depth where a compressive stress value is 50 MPa or more is 50 μm or more.

16. An electronic device housing member comprising the chemically strengthened glass according to claim 11.

17. An electronic device housing, wherein a surface area of a part formed of the chemically strengthened glass according to claim 11 occupies 40% or higher with respect to a surface area of the housing.

18. The electronic device housing according to claim 17, wherein a thickness of a thinnest part of the chemically strengthened glass is 0.6 mm or less.

* * * * *